(12) United States Patent
Abdulsaid et al.

(10) Patent No.: US 12,522,080 B2
(45) Date of Patent: Jan. 13, 2026

(54) DYNAMIC REGENERATIVE BRAKING SYSTEM

(71) Applicant: FCA US LLC, Auburn Hill, MI (US)

(72) Inventors: Ali Abdulsaid, Northville, MI (US); Austin Payne, Livonia, MI (US); Refaat Mustafa, Windsor (CA); Francis J Carr, II, Lake Orion, MI (US); Vanessa K Vitso, Ypsilanti, MI (US)

(73) Assignee: FCA US LLC, Auburn Hills, MI (US)

( * ) Notice: Subject to any disclaimer, the term of this patent is extended or adjusted under 35 U.S.C. 154(b) by 130 days.

(21) Appl. No.: 18/526,049

(22) Filed: Dec. 1, 2023

(65) Prior Publication Data
US 2025/0178446 A1 Jun. 5, 2025

(51) Int. Cl.
*B60L 7/18* (2006.01)
*G01C 21/34* (2006.01)

(52) U.S. Cl.
CPC ............ *B60L 7/18* (2013.01); *G01C 21/3469* (2013.01); *B60L 2240/622* (2013.01); *B60L 2240/64* (2013.01); *B60L 2240/642* (2013.01); *B60L 2240/647* (2013.01); *B60L 2240/68* (2013.01)

(58) Field of Classification Search
CPC .. B60L 7/18; B60L 2240/622; B60L 2240/64; B60L 2240/642; B60L 2240/647; B60L 2240/68; G01C 21/3469
See application file for complete search history.

(56) References Cited

U.S. PATENT DOCUMENTS

| | | | |
|---|---|---|---|
| 2019/0178662 A1* | 6/2019 | Son | B60K 6/387 |
| 2021/0237581 A1* | 8/2021 | Rajaie | B60L 15/2009 |
| 2025/0074257 A1* | 3/2025 | Chapman | B60L 58/40 |

* cited by examiner

Primary Examiner — Alan D Hutchinson
(74) Attorney, Agent, or Firm — Jeremy J. Klobucar

(57) ABSTRACT

A dynamic regenerative braking system (DRBS) for an electrified vehicle having a high voltage (HV) battery system includes a user interface configured to display information and to receive user input for a route selection of the electrified vehicle, a global positioning satellite (GPS)/map data system configured to obtain GPS and map data associated with a current trip of the electrified vehicle, an advanced driver assistance system (ADAS) module having one or more sensors configured to obtain surrounding vehicle data and upcoming road conditions data, and a brake module configured to control a regenerative braking system and provide current road grade data. A controller is programmed to determine an energy efficient navigational route to a destination, which maximizes a power regeneration of the HV battery system via the regenerative braking system, based on the GPS/map data, the surrounding vehicle data, the upcoming road conditions data, and the current road grade data.

17 Claims, 3 Drawing Sheets

DYNAMIC REGENERATIVE BRAKING SYSTEM

FIELD

The present application generally relates to electrified vehicles and, more particularly, to a dynamic regenerative braking system for electrified vehicles.

BACKGROUND

A powertrain is configured to generate and transfer torque to a driveline of a vehicle for propulsion. Some electrified powertrains include an electric motor configured for regenerative braking that is separate from friction brakes. Conventional control systems activate the regenerative braking primarily based on driving style, acceleration targets, and high voltage battery state of charge. However, these systems utilize separately designed and dedicated regenerative power maps that are primarily driven by vehicle speed and power demands by the driver. As such, the conventional systems are limited when determining when regenerative braking should be applied. Accordingly, while such conventional electrified powertrain control systems do work for their intended purpose, there exists an opportunity for improvement in the relevant art.

SUMMARY

In accordance with one example aspect of the invention, a dynamic regenerative braking system (DRBS) for an electrified vehicle having a high voltage (HV) battery system is provided. In one example implementation, the DRBS includes a user interface configured to display information and to receive user input for a route selection of the electrified vehicle, a global positioning satellite (GPS)/map data system configured to obtain GPS and map data associated with a current trip of the electrified vehicle, an advanced driver assistance system (ADAS) module having one or more sensors configured to obtain surrounding vehicle data and upcoming road conditions data, and a brake module configured to control a regenerative braking system and provide current road grade data. A controller is programmed to determine an energy efficient navigational route to a destination of travel, which maximizes a power regeneration of the HV battery system via the regenerative braking system, based on the GPS/map data, the surrounding vehicle data, the upcoming road conditions data, and the current road grade data.

In addition to the foregoing, the described system may include one or more of the following features: wherein the determined navigational route is chosen to be within a predetermined time limit to reach the destination of travel; wherein the controller is further programmed to propose, to a user via the user interface, the determined energy efficient navigational route; wherein the controller is configured to continuously update the energy efficient navigational route based on a real-time of the GPS/map data, surrounding vehicle data, upcoming road conditions data, and road grade data.

In addition to the foregoing, the described system may include one or more of the following features: wherein the controller is further programmed to continuously adjust a regenerative braking level of the regenerative braking system, to further maximize the power regeneration of the HV battery system via the regenerative braking system, based on a real-time of the GPS/map data, surrounding vehicle data, upcoming road conditions data, and road grade data; and wherein the controller is further programmed to lower the regenerative braking level when the GPS/map data indicates the electrified vehicle is traveling on a highway, lower the regenerative braking level when the upcoming road conditions data indicates an upcoming curve in the road, lower the regenerative braking level when the road grade data indicates a positive grade, raise the regenerative braking level when the road grade data indicates a negative grade, and lower the regenerative braking level when the GPS/map data indicates traffic congestion, and the surrounding vehicle data indicates a presence of other vehicles.

In addition to the foregoing, the described system may include one or more of the following features: a body control module (BCM) configured to determine a terrain mode selection of the electrified vehicle, and wherein the controller is further programmed to adjust a regenerative braking level of the regenerative braking system, based on an intended road surface indicated by the terrain mode selection, to further maximize the power regeneration of the HV battery system via the regenerative braking system, and maintain a consistent deceleration rate to improve drivability; wherein the GPS/map data includes predictive grade calculation data, traffic data, and speed limit data; and wherein the one or more sensors of the ADAS module include one or more lidar sensors, one or more radar sensors, and one or more cameras.

In accordance with another example aspect of the invention, a control method for a dynamic regenerative braking system (DRBS) for an electrified vehicle having a high voltage (HV) battery system is provided. In one example implementation, the method includes receiving, by a controller and a user interface, a destination of travel for the electrified vehicle; receiving, by the controller and from a global positioning satellite (GPS)/map system, GPS/map data associated with a current trip of the electrified vehicle; receiving, by the controller and from an advanced driver assistance system (ADAS) module having one or more sensors, surrounding vehicle data and upcoming road conditions data; receiving, by the controller and from a brake module configured to control a regenerative braking system, current road grade data; and determining, by the controller, an energy efficient navigational route to the destination of travel, which maximizes a power regeneration of the HV battery system via the regenerative braking system, based on the GPS/map data, the surrounding vehicle data, the upcoming road conditions data, and the current road grade data.

In addition to the foregoing, the described method may include one or more of the following features: wherein the determined navigational route is chosen to be within a predetermined time limit to reach the destination of travel; proposing, by the controller and the user interface, the determined energy efficient navigational route; continuously updating, by the controller, the energy efficient navigational route based on a real-time of the GPS/map data, surrounding vehicle data, upcoming road conditions data, and road grade data; and continuously adjusting, by the controller, a regenerative braking level of the regenerative braking system, to further maximize the power regeneration of the HV battery system via the regenerative braking system, based on a real-time of the GPS/map data, surrounding vehicle data, upcoming road conditions data, and road grade data.

In addition to the foregoing, the described method may include one or more of the following features: lowering, by the controller, the regenerative braking level when the GPS/map data indicates the electrified vehicle is traveling on a highway; lowering, by the controller, the regenerative braking level when the upcoming road conditions data indicates an upcoming curve in the road; lowering, by the controller, the regenerative braking level when the road grade data indicates a positive grade; raising, by the controller, the regenerative braking level when the road grade data indicates a negative grade; and lowering, by the controller, the regenerative braking level when the GPS/map data indicates traffic congestion, and the surrounding vehicle data indicates a presence of other vehicles.

In addition to the foregoing, the described method may include one or more of the following features: receiving, by the controller and from a body control module (BCM), a terrain mode selection of the electrified vehicle, and adjusting, by the controller, a regenerative braking level of the regenerative braking system, based on an intended road surface indicated by the terrain mode selection, to further maximize the power regeneration of the HV battery system via the regenerative braking system, and maintain a consistent deceleration rate to improve drivability; wherein the GPS/map data includes predictive grade calculation data, traffic data, and speed limit data; and wherein the one or more sensors of the ADAS module include one or more lidar sensors, one or more radar sensors, and one or more cameras.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
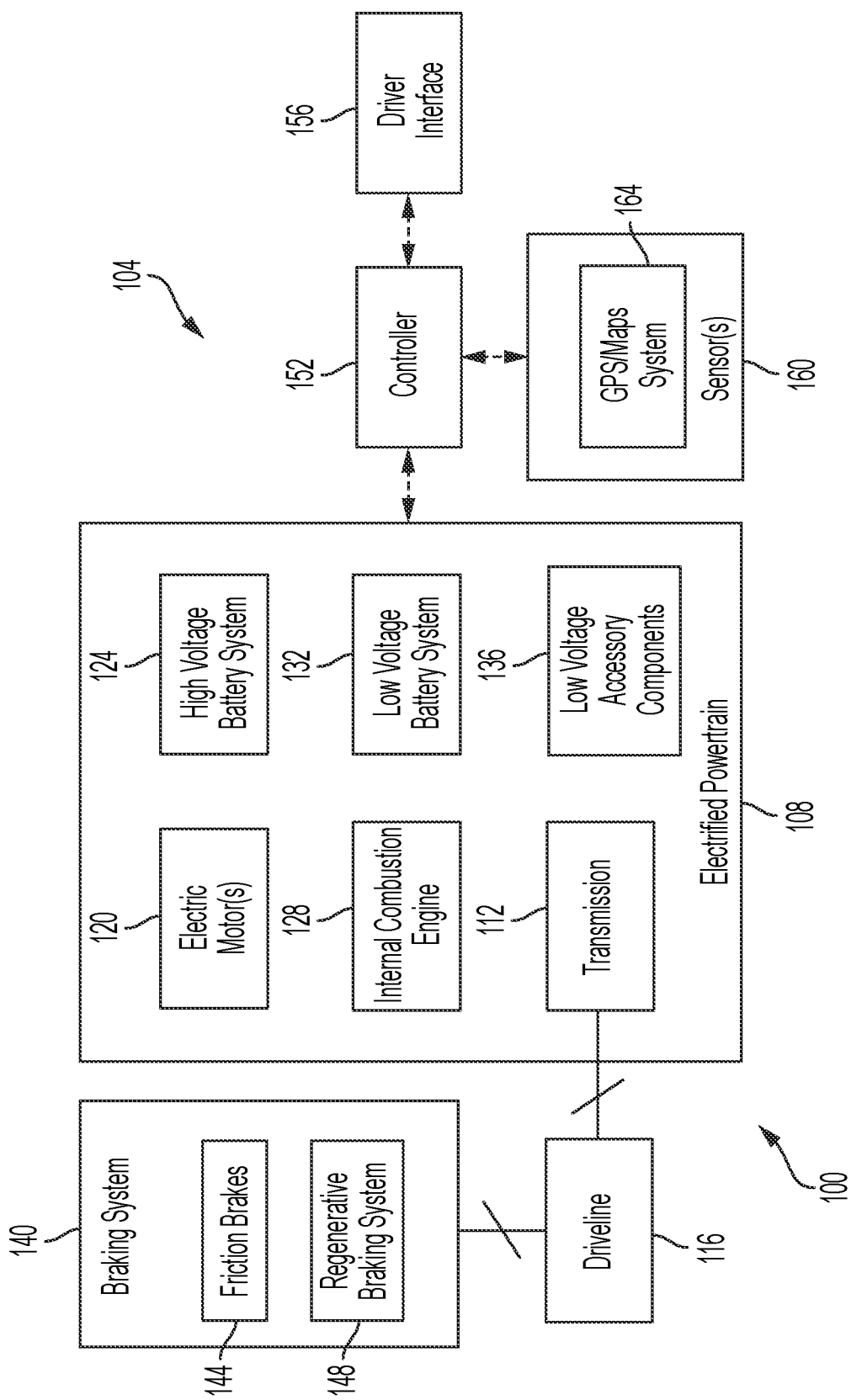
FIG. 1 is a functional block diagram of an electrified vehicle with an example electrified powertrain with a dynamic regenerative braking system according to the principles of the present application.

As previously discussed, conventional regenerative braking systems are limited in the situations when the regenerative braking can be applied. Accordingly, described herein are systems and methods for dynamic regenerative braking to maximize the energy usage and drivability of a vehicle.

In one example, the dynamic regenerative braking system includes a plurality of smart sensors configured to predict and calculate when coast regen should be maximized based on terrain, environmental conditions, AWD/FWD/RWD configurations and high voltage (HV) battery state of charge (SOC). In one example, coast regen is regenerative braking during 0% pedal maneuvers, which mimics conventional powertrain friction/negative torque generated by an internal combustion engine when no firing of cylinders is taking place. This is utilized to optimize the system behavior to provide a maximum regenerative power in order to generate electricity or braking power to the vehicle and recharge the HV battery. A propulsion system controller is also configured to determine the most energy efficient route for optimal regeneration based on GPS data and vehicle data to send navigational route suggestions to the vehicle radio (e.g., infotainment display/user interface).

The system is configured to receive and utilize various inputs including sensors and GPS data of the final destination to maximize the energy usage and drivability of the vehicle in multiple conditions including general driving, on-track, or off-road. The system is also configured to utilize component temperature data to determine if the thermal system is in a non-optimal state, SOC is too high for regen, and there is upcoming potential for regen based on map data. The thermal system will then actuate to heat/cool the components to allow regen potential. In this way, these techniques leverage GPS/map system data to intelligently and proactively manage energy storage in anticipation of regeneration regions.

The system is dynamic and continuously adjusts the implemented regenerative strategy to the terrain selected by the driver with real-time data from the systems described herein. For example, when driving off-road, the system reduces regen to improve drivability on a loose surface. Additionally, the system is configured to use GPS data and ADAS sensors to improve regen braking levels in track or multiple cornering environments to improve drivability.

In one example, the dynamic regenerative braking system uses GPS data in a "Race Track Setting" mode to determine upcoming track terrain and modulate the regen level to optimal braking levels for traction/stability during the event or terrain (e.g., optimal braking level to navigate a corner based on speed, track position, and known vehicle characteristics). GPS data may also be used to determine when to use charge depleting versus charge sustaining (hybrids) behavior to maximize regen capacity based on upcoming road scenarios. Further, by mapping a route based on elevation gain and loss, the system can predict the amount of energy use of a specific route, and subsequently target routes that reduce energy consumption and have a higher regen recouperation potential, to thereby provide maximum electric vehicle range. If a route has a large number of curves, the system can increase the level of regen in that region to reduce the need to use the brake pedal and provide better driver perceived deceleration.

In one example, the dynamic regenerative braking system uses one or more vehicle accelerometer sensors to determine the road gradient and maximize or minimize the braking power of regenerative braking in order to maximize regenerative efficiency and minimize powertrain drag during coast downs. In another example, the dynamic regenerative braking system uses ADAS sensors (e.g., lidar, radar, camera) during the "Race Track Setting" mode to determine upcoming track terrain and modulate braking regen level to optimal braking levels for traction and stability for the event and terrain. Additionally, braking regen level may be modulated based on positions of other vehicles around the driver's vehicle. This maximizes regen recuperation for low or no regen, when possible, on a tip out to improve efficiency. The system also modulates coast regen braking to a level to keep distance from other vehicles in front of the driver's vehicle. With factors such as road gradient, traffic speed signage, and traffic conditions, the system is configured to manipulate the regenerative braking level to either allow the vehicle to coast further, or impose higher negative torque to slow the vehicle down and maximize energy regeneration.

In one example, the dynamic regenerative braking system utilizes sensor data of environmental temperature conditions along with the HV battery SOC to identify where and when on the customer's route maximum regenerative braking can and should be applied. For example, based on powertrain component temperatures, if possible, the system heats or cools to a more optimal level prior to the upcoming braking regen event by creating braking regen capacity, to thereby recover the energy later on in the route. In another example, the dynamic regenerative braking system utilizes a terrain mode to know intended vehicle conditions (e.g., driving surface conditions). With this mode, the system is configured to maintain a more consistent deceleration rate by reducing or increasing braking regen level based on the terrain. For example, in sand, the system reduces braking regen level due to increased deceleration rate in the sand, to maintain a similar feel to nominal driving conditions when driving on normal roads with minimal gradient variations. In this way, the system adjusts braking regen level based on the selected terrain mode (e.g., snow, sand, sport, etc.).

Referring now to FIG. 1, a functional block diagram of an electrified vehicle 100 having an example dynamic regenerative braking system 104 according to the principles of the present application is illustrated. The electrified vehicle 100 could be any suitable electrified vehicle (e.g., plug-in hybrid electric vehicle (PHEV), battery electric vehicle (BEV), etc.) configured for recharging via electrified vehicle supply equipment (EVSE), including residential or roadside charging stations (not shown).

While a battery-equipped electrified vehicle 100 is shown and generally described herein, it will be appreciated that the techniques of the present application are not limited to battery systems and are applicable to any suitable energy storage system. Thus, the term "energy storage system" as used herein could also be applicable to, for example, fuel cell electrified vehicles (FCEVs), which have hydrogen (H2) as stored energy. A FCEV, however, is a range extender system, as the disclosed electrified vehicle 100 may be as well (i.e., an REEV), which has a gasoline-powered generator (e.g., an internal combustion engine) converting liquid gasoline (or diesel) to electricity while the FCEV has a fuel cell system converting H2 to electricity.

The electrified vehicle 100 is powered by an electrified powertrain 108 that generates and transfers drive torque (e.g., via a transmission 112, such as a multi-speed automatic transmission) to a driveline 116. The electrified powertrain 108 includes one or more electric motors 120 powered by a high voltage battery system 124 and an optional internal combustion engine 128 configured to combust a mixture of air and fuel (diesel, gasoline, etc.). In other words, as the one or more electric motors 120 are operated to generate drive torque (torque consumer mode), the SOC of the high voltage battery system 124 is depleted. The electrified powertrain 108 also includes a low voltage battery system 132 (e.g., a 12-volt lead-acid or lithium-ion battery system) configured to power low voltage accessory loads 136 of the electrified vehicle 100 (pumps, fans, displays, etc.). The electrified powertrain 108 also includes a braking system 140 comprising a conventional friction braking system 144 and regenerative braking system 148. The regenerative braking system 148 is configured to brake (decelerate) the driveline 116 and convert the kinetic energy to electrical energy, such as for recharging the high voltage battery system 124.

A direct current (DC) to DC converter (not shown) or other suitable system could be implemented between the high and low voltage battery systems 124, 132 for stepping up/down respective DC voltages (e.g., for recharging therebetween). A controller 152 controls operation of the electrified vehicle 100, including controlling the electrified powertrain 108 to satisfy a torque request (e.g., via a driver interface 156, such as an accelerator pedal). It will be appreciated that the torque request may not come directly from the driver, but instead could be a torque request generated by an advanced driver assistance (ADAS) or autonomous driving system. The controller 152 is also configured to receive information from a set of sensors 160 to control operation of the electrified vehicle 100. Non-limiting examples of the set of sensors 160 include vehicle speed/altitude sensors, electrified powertrain speed/temperature/electrical parameter/SOC sensors, and a GPS/maps system 164. The GPS/maps system 164 could include a global navigation satellite system (GNSS) transceiver (not shown) configured to determine a precise geo-location of the electrified vehicle 100 (e.g., precise coordinates of the electrified vehicle 100).

The GPS/maps system 164 could also be configured to determine and localize the position of the electrified vehicle 100 relative to a map, such as a high-definition (HD) map. Map data could be stored remotely (e.g., at a remote server), locally (e.g., at the controller 152), or some combination thereof. The map data includes, among other things, a plurality of road segments each having varying road attributes (length, speed limit, curvature, elevation, grade, etc.). A route for the electrified vehicle 100 could include a plurality of these road segments from a start point to a desired end point. This route could be user-specified (e.g., via a driver input) or based on historical data/patterns, such as when/where the driver normally drives the electrified vehicle 100. In some implementations, the electrified vehicle 100 is configured to perform eco-routing, which refers to a process of minimizing battery system SOC consumption based on road attributes associated with the various road segments. For example, during eco-routing, stop signs and congested traffic regions could be avoided. The controller 152 is also configured to perform dynamic regenerative braking control techniques of the present application, which will now be described in greater detail with reference to FIGS. 2 and 3.

Figure 2:
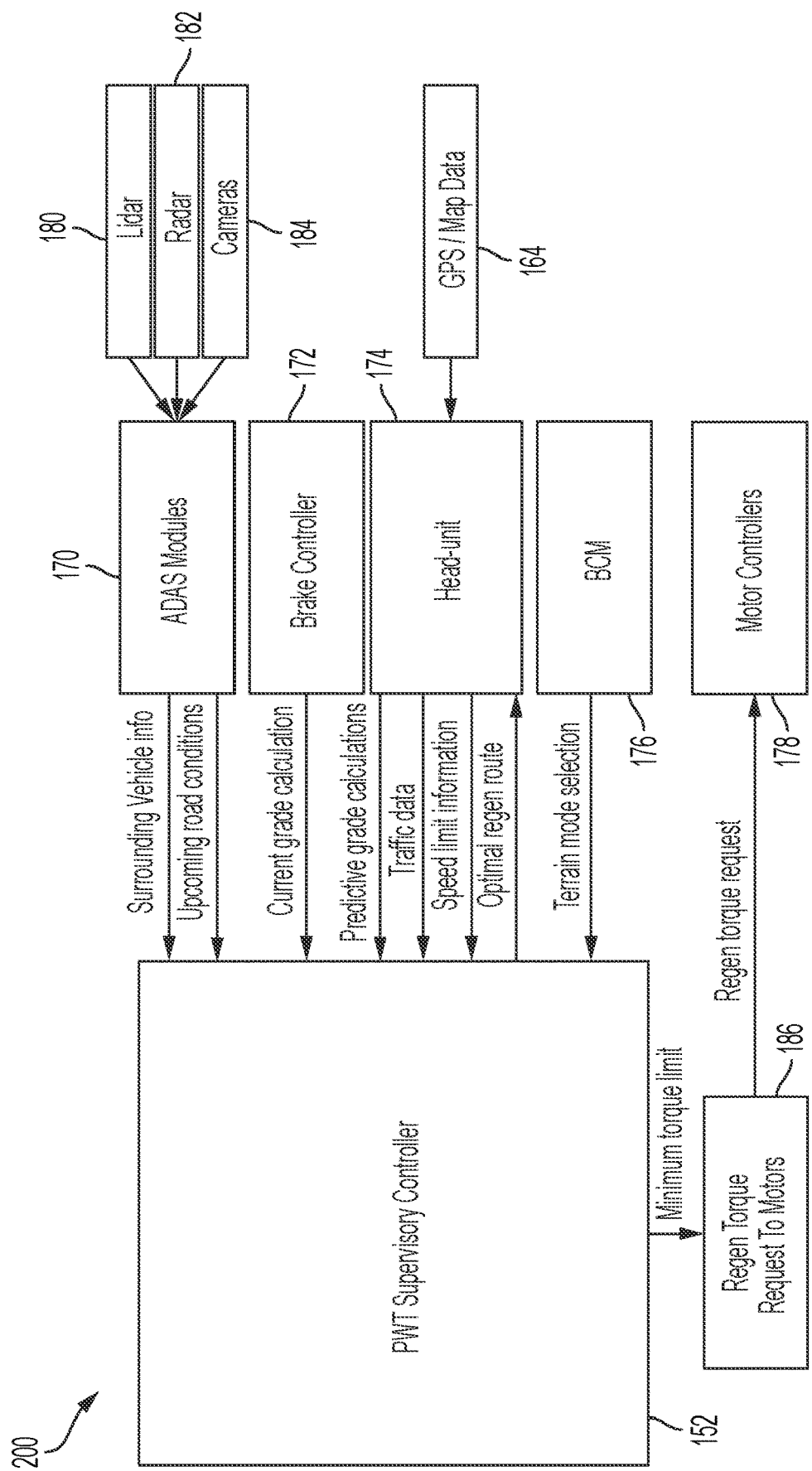
FIG. 2 is a schematic diagram of an example architecture of the dynamic regenerative braking system according to the principles of the present application.

With reference now to FIG. 2, an example architecture 200 of the dynamic regenerative braking system (DRBS) 104 according to the principles of the present application is presented. As shown, the DRBS 104 includes the supervisory controller 152, which is in signal communication with and is configured to coordinate interaction between powertrain modules, sensors, and other electrical and electronic modules or components. Additionally, the controller 152 is configured to control the vehicle's propulsion system and determine optimal driving conditions and select the most efficient level of braking regen to increase vehicle range. In the example embodiment, the controller 152 is in signal communication with an advanced driver assistance system (ADAS) module 170, a brake controller 172, a head unit 174, a body control module (BCM) 176, and a motor controller 178.

The ADAS module 170 is configured to control the autonomous features of the vehicle such as, for example, adaptive cruise control, autonomous driving, and intelligent e-coasting. The ADAS module 170 is configured to provide input signals indicating the vehicle's surrounding and upcoming road events, such as objects surrounding the vehicle 100 and mapping out of the road ahead. The ADAS module 170 is in signal communication with various sensors/components including a LIDAR system 180, a radar system 182, and one or more cameras 184, which are configured to map out the road, identify surrounding objects, identify speed limits, etc.

The brake controller 172 is configured to control braking of the braking system 140, including the friction brakes 144 and the regenerative braking system 148, as well as determine a grade of the road. The head unit 174 is an infotainment hub of the vehicle 100 and includes one or more displays (not shown) to display road map information (e.g., via a user interface), for example, from GPS/maps system 164. The head unit 174 is configured to provide input signals indicating predictive grade calculations, traffic data, and speed limit information to controller 152, and receive input signals therefrom indicating an optimal regen route.

In the example embodiment, the BCM 176 interfaces with various vehicle body components and is configured to provide a drive/terrain mode (e.g., sport, off-road, sand, etc.) selection input to supervisory controller 152. The motor controller 178 is configured to control the vehicle electric motor(s) 120 based on inputs from the supervisory controller 152, such as a regen torque request 186. In this way, the supervisory controller 152 is configured to select an optimal regen level and adjust a minimum torque limit accordingly as the regen torque request 186 to motor controller 178. For example, the controller 152 receives selected drive modes from the BCM 176 and increases or decreases regen braking based on the drive mode selection that achieves an optimal regenerative braking level.

Additionally, in the example implementation, the supervisory controller 152 is configured to provide an auto coast regen level selection. The ADAS module 170 receives sensor input indicating surrounding vehicle information such as distance from a vehicle ahead or an upcoming turn on a road/track. In highway conditions, no traffic ahead of the vehicle may result in a lower regen level, while regen level may be optimized based on upcoming curves on a road for better driving assist. Road grade calculation is taken into consideration when determining the optimal regen level. For example, a positive grade may result in a lower regen level, whereas a negative grade may result in a higher regen level.

Moreover, traffic data along with the ADAS information can be taken into consideration to adjust the regen level accordingly. For example, high traffic congested areas may benefit from higher levels of regen. Additionally, speed limit information may be used to predict if a heavy regen would be optimal for a given drive condition. For example, high speed limits may suggest that the vehicle is driving on a highway and will have an increased steady state speed operation, in which case lower regen levels will be more optimal. This is done, for example, to avoid additional energy consumption and continue to momentum of the vehicle while allowing the driver to rely on the brake input to slow the vehicle down. For example, if the vehicle is driving along a straight stretch of highway with no traffic, it may be more efficient to reduce the regen braking to complete the desired route. As previously noted, terrain mode selection made by the driver will also adjust the level of regen accordingly.

In the example embodiment, route information received from the GPS/map system 164 includes route/elevation data that may be utilized to determine the most efficient route based on current vehicle energy information (e.g., SOC, remaining HV battery energy level). Based on this information, the supervisory controller 152 may send route suggestions to the head unit 174 and/or GPS/maps system 164 to maximize energy recuperation and follow the most energy efficient route. For example, the GPS/maps system 164 may provide controller 152 with multiple route options with elevation change data. The controller 152 then determines which of those options is the most efficient based on current information (e.g., energy recuperation and estimated energy usage on the route), and provides direction back to the head unit 174 on which route to use.

Figure 3:
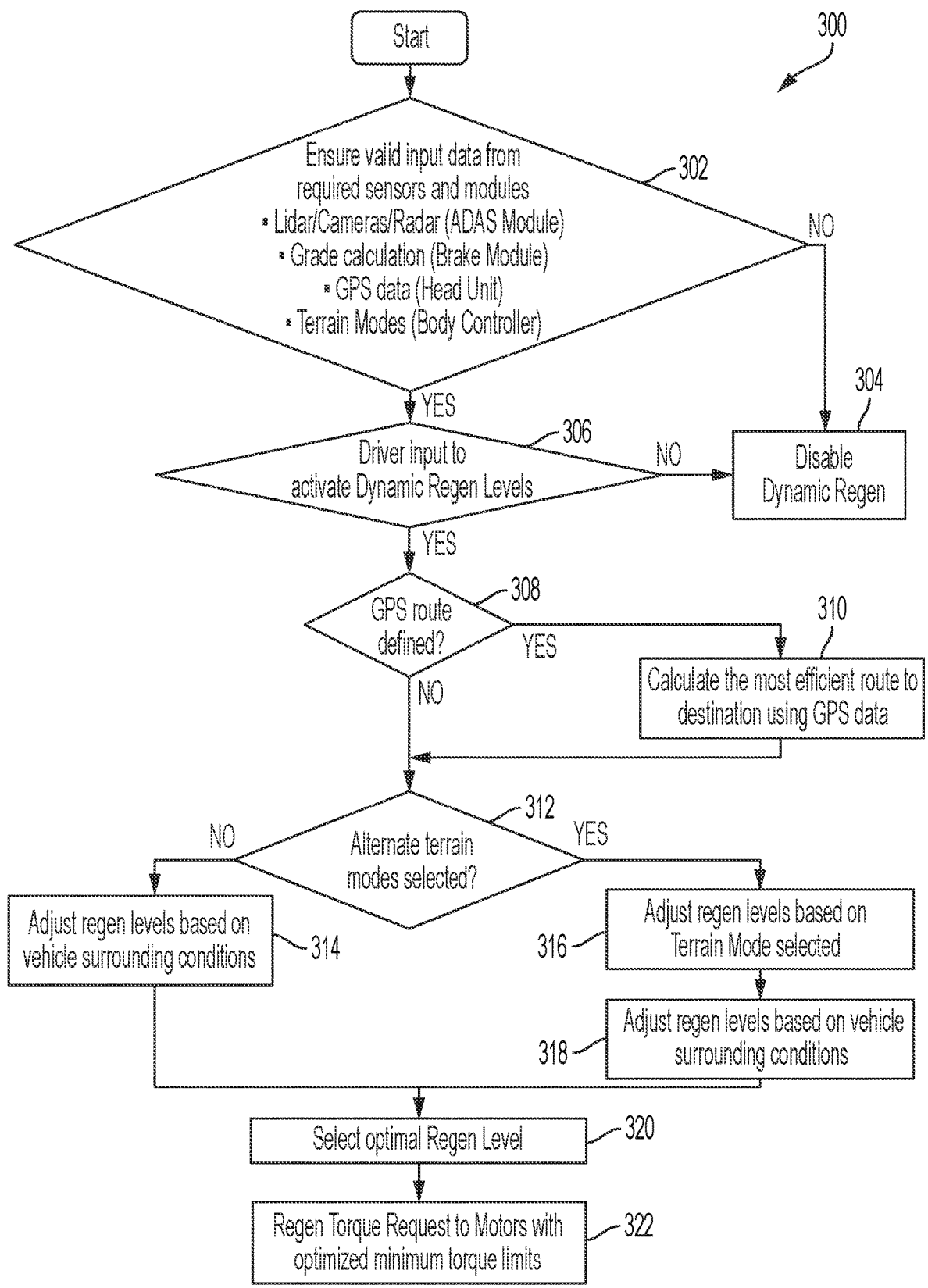
FIG. 3 is a flow diagram of an example control method for the dynamic regenerative braking system according to the principles of the present application.

Referring now to FIG. 3, a flow diagram of an example dynamic regenerative braking control method 300 for an electric vehicle according to the principles of the present application is illustrated. While the electric vehicle 100 and the components of FIGS. 1-2 are specifically referenced for illustrative/descriptive purposes, it will be appreciated that the method 300 could be applicable to any suitably configured electric vehicle.

At step 302, the controller 152 ("control") determines whether an optional set of one or more preconditions are satisfied. This could include, for example only, the electric vehicle 100 being powered up and running, sufficient communication/connectivity with components/modules, and/or there being no malfunctions or faults present that would otherwise affect the operation of method 300 and the electric vehicle 100. In the example embodiment, this includes valid connectivity/input from ADAS module 170 (e.g., LIDAR system 180, radar system 182, and cameras 184), the brake module 172 for grade calculation, the head unit 174 and GPS/maps system 164, and BCM 176 for selected vehicle terrain mode. If the preconditions are not satisfied, control proceeds to step 304 and disables dynamic regenerative braking. Method 300 then ends or returns to step 302. If the preconditions are satisfied, control proceeds to step 306.

At step 306, control determines if there is driver input to activate dynamic regenerative braking levels, for example, via a button or switch. If false, control proceeds to step 304 and the method 300 ends or returns to step 302. If true, control proceeds to step 308 and determines if a navigational route has been defined. This route could be provided by the driver or could be based on prediction by the controller 152 (e.g., a most-likely route based on past driving behavior among other information). If false, control proceeds to step 312. If true, supervisory controller 152 determines/predicts the most efficient route (e.g., battery energy, time, distance, etc.) to the destination using data from GPS/maps system 164.

For example, the most efficient route may be the most energy efficient route which maximizes a power regeneration and/or conservation of the HV battery system 124. This is determined based on the various data described herein, such as elevation change along the route, current vehicle energy information (e.g., SOC, remaining HV battery energy level), and traffic data along the route (e.g., traffic congestion, speed limit, etc.). This route may be also be chosen to be within system/user predefined constraints, such as total allowable time, distance, etc. Controller 152 may then suggest the most energy efficient route to the user via the head unit 174. Control then proceeds to step 312.

At step 312, control determines if alternate terrain modes are selected (e.g., via BCM 176) (e.g., sand, snow, sport, normal, eco, all-terrain, rock climbing, creeping, etc.). If no, at step 314, control adjusts regenerative braking levels based on real-time vehicle surrounding conditions. For example, when the driver selects a drive mode or starts the vehicle in a default mode, it becomes the baseline of the regen braking level. Then once the feature is activated and intelligently determines the external conditions, control begins varying the regen braking levels for energy efficiency and maximum power regeneration. In one example, the regenerative braking levels are adjusted based on real-time surrounding traffic data, speed limit data, road condition/grade data, and GPS track data. For example, with congested traffic, higher regen braking may be more desirable than sailing the vehicle, or less regen braking may be more desirable to minimize friction brake use, automate the driving experience, and maximize regen power. Control then proceeds to step 320.

If alternate terrain modes are selected, control proceeds to step 316 and adjusts regenerative braking levels based on the selected Terrain Mode, to thereby maximize regen efficiency and maximum power regeneration. Control then proceeds to step 318 and adjusts regenerative braking levels based on real-time vehicle surrounding conditions. For example, control adjusts the numerical amount of the regen braking level, which reflects the level of negative torque or regen provided by the powertrain, thus allowing external conditions to be considered for a holistic approach. Control then proceeds to step 320.

At step 320, supervisory controller 152 selects an optimal regenerative braking level, for example, to provide the most efficient braking level for the given drive cycle and/or most durable driveability/comfort for the driver. At step 322, controller 152 sends a braking regen torque request 186 to motor controller 178 with optimized minimum torque, for example, to provide the most efficient braking level for the given drive cycle and/or most durable driveability/comfort for the driver. Control then ends or returns to step 302.

Described herein are systems and methods for dynamic regenerative braking of an electrified vehicle. The system utilizes multiple inputs from the GPS/maps system, ADAS module, brake controller, and body control module to provide an adaptive and intelligent sensing system to generate electricity and elongate the state of charge of the high voltage battery. The system is also configured to determine an energy efficient navigational route for maximum high voltage battery regeneration based on GPS data and vehicle data.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A dynamic regenerative braking system (DRBS) for an electrified vehicle having a high voltage (HV) battery system, the DRBS comprising:
    a user interface configured to display information and to receive user input for a route selection of the electrified vehicle;
    a global positioning satellite (GPS)/map data system configured to obtain GPS and map data associated with a current trip of the electrified vehicle;
    an advanced driver assistance system (ADAS) module having one or more sensors configured to obtain surrounding vehicle data and upcoming road conditions data;
    a brake module configured to control a regenerative braking system and provide current road grade data; and
    a controller, having one or more processors and a non-transitory computer readable storage medium, programmed to:
        determine an energy efficient navigational route to a destination of travel, which maximizes a power regeneration of the HV battery system via the regenerative braking system, based on the GPS/map data, the surrounding vehicle data, the upcoming road conditions data, and the current road grade data; and
        continuously adjust a regenerative braking level of the regenerative braking system, to further maximize the power regeneration of the HV battery system via the regenerative braking system, based on a real-time of the GPS/map data, surrounding vehicle data, upcoming road conditions data, and road grade data.

2. The DRBS of claim 1, wherein the determined navigational route is chosen to be within a predetermined time limit to reach the destination of travel.

3. The DRBS of claim 1, wherein the controller is further programmed to propose, to a user via the user interface, the determined energy efficient navigational route.

4. The DRBS of claim 1, wherein the controller is configured to continuously update the energy efficient navigational route based on a real-time of the GPS/map data, surrounding vehicle data, upcoming road conditions data, and road grade data.

5. The DRBS of claim 1, wherein the controller is further programmed to:
    lower the regenerative braking level when the GPS/map data indicates the electrified vehicle is traveling on a highway,
    lower the regenerative braking level when the upcoming road conditions data indicates an upcoming curve in the road,
    lower the regenerative braking level when the road grade data indicates a positive grade,
    raise the regenerative braking level when the road grade data indicates a negative grade, and
    lower the regenerative braking level when the GPS/map data indicates traffic congestion, and the surrounding vehicle data indicates a presence of other vehicles.

6. The DRBS of claim 1, further comprising a thermal system configured to heat and/or cool one or more components of the electrified vehicle, wherein the controller is further programmed to:
    identify an upcoming braking regeneration event on the energy efficient navigational route; and
    heat and/or cool, by the thermal system, the one or more components to thereby increase a braking regeneration potential and recover energy later on in the energy efficient navigational route.

7. A dynamic regenerative braking system (DRBS) for an electrified vehicle having a high voltage (HV) battery system, the DRBS comprising:
    a user interface configured to display information and to receive user input for a route selection of the electrified vehicle;
    a global positioning satellite (GPS)/map data system configured to obtain GPS and map data associated with a current trip of the electrified vehicle;

an advanced driver assistance system (ADAS) module having one or more sensors configured to obtain surrounding vehicle data and upcoming road conditions data;

a brake module configured to control a regenerative braking system and provide current road grade data;

a body control module (BCM) configured to determine a driver-selected terrain mode selection of the electrified vehicle, and a controller, having one or more processors and a non-transitory computer readable storage medium, programmed to:

determine an energy efficient navigational route to a destination of travel, which maximizes a power regeneration of the HV battery system via the regenerative braking system, based on the GPS/map data, the surrounding vehicle data, the upcoming road conditions data, and the current road grade data; and adjust a regenerative braking level of the regenerative braking system, based on an intended road surface indicated by the terrain mode selection, to:

further maximize the power regeneration of the HV battery system via the regenerative braking system; and maintain a consistent deceleration rate to improve drivability.

8. The DRBS of claim 1, wherein the GPS/map data includes predictive grade calculation data, traffic data, and speed limit data.

9. The DRBS of claim 1, wherein the one or more sensors of the ADAS module include one or more lidar sensors, one or more radar sensors, and one or more cameras.

10. A control method for a dynamic regenerative braking system (DRBS) for an electrified vehicle having a high voltage (HV) battery system, the method comprising:

receiving, by a controller, including one or more processors and a non-transitory computer readable storage medium, and a user interface, a destination of travel for the electrified vehicle;

receiving, by the controller and from a global positioning satellite (GPS)/map system, GPS/map data associated with a current trip of the electrified vehicle;

receiving, by the controller and from an advanced driver assistance system (ADAS) module having one or more sensors, surrounding vehicle data and upcoming road conditions data;

receiving, by the controller and from a brake module configured to control a regenerative braking system, current road grade data;

determining, by the controller, an energy efficient navigational route to the destination of travel, which maximizes a power regeneration of the HV battery system via the regenerative braking system, based on the GPS/map data, the surrounding vehicle data, the upcoming road conditions data, and the current road grade data; and continuously adjusting, by the controller, a regenerative braking level of the regenerative braking system, to further maximize the power regeneration of the HV battery system via the regenerative braking system, based on a real-time of the GPS/map data, surrounding vehicle data, upcoming road conditions data, and road grade data.

11. The control method of claim 10, wherein the determined navigational route is chosen to be within a predetermined time limit to reach the destination of travel.

12. The control method of claim 10, further comprising:
proposing, by the controller and the user interface, the determined energy efficient navigational route.

13. The control method of claim 10, further comprising:
continuously updating, by the controller, the energy efficient navigational route based on a real-time of the GPS/map data, surrounding vehicle data, upcoming road conditions data, and road grade data.

14. The control method of claim 10, further comprising:
lowering, by the controller, the regenerative braking level when the GPS/map data indicates the electrified vehicle is traveling on a highway, lowering, by the controller, the regenerative braking level when the upcoming road conditions data indicates an upcoming curve in the road, lowering, by the controller, the regenerative braking level when the road grade data indicates a positive grade, raising, by the controller, the regenerative braking level when the road grade data indicates a negative grade, and lowering, by the controller, the regenerative braking level when the GPS/map data indicates traffic congestion, and the surrounding vehicle data indicates a presence of other vehicles.

15. The control method of claim 10, further comprising:
receiving, by the controller and from a body control module (BCM), a terrain mode selection of the electrified vehicle, and adjusting, by the controller, a regenerative braking level of the regenerative braking system, based on an intended road surface indicated by the terrain mode selection, to:

further maximize the power regeneration of the HV battery system via the regenerative braking system; and maintain a consistent deceleration rate to improve drivability.

16. The control method of claim 10, wherein the GPS/map data includes predictive grade calculation data, traffic data, and speed limit data.

17. The control method of claim 10, wherein the one or more sensors of the ADAS module include one or more lidar sensors, one or more radar sensors, and one or more cameras.

* * * * *